US010754507B1

(12) United States Patent
Chandler et al.

(10) Patent No.: US 10,754,507 B1
(45) Date of Patent: Aug. 25, 2020

(54) CONTENT-ITEM NOTIFICATIONS

(71) Applicant: Amazon Technologies, Inc., Reno, NV (US)

(72) Inventors: Otis Yeager Chandler, San Francisco, CA (US); Jessica Kathleen Quinn Donaghy, San Francisco, CA (US); Seth Gershom Goldstein, San Francisco, CA (US); Jeffrey Paul Helbling, Seattle, WA (US); Peter Thomas Killalea, Seattle, WA (US); Brian Mitchell Percival, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1173 days.

(21) Appl. No.: 14/229,632

(22) Filed: Mar. 28, 2014

(51) Int. Cl.
 *G06F 3/0483* (2013.01)
 *G06Q 10/10* (2012.01)
 *G06Q 10/06* (2012.01)
(52) U.S. Cl.
 CPC ..... *G06F 3/0483* (2013.01); *G06Q 10/063114* (2013.01); *G06Q 10/109* (2013.01)
(58) Field of Classification Search
 CPC .............. G06F 3/0483; G06F 15/0291; G06F 17/24–248
 See application file for complete search history.

(56) References Cited

U.S. PATENT DOCUMENTS

| 5,697,793 A | * | 12/1997 | Huffman | ............. G06F 15/0283 434/156 |
| 8,260,915 B1 | * | 9/2012 | Ashear | ................... G06F 13/00 709/224 |
| 8,692,763 B1 | * | 4/2014 | Kim | .................... G09G 3/3453 345/156 |
| 8,930,820 B1 | * | 1/2015 | Elwell | ................. G06Q 10/109 705/319 |
| 2001/0007980 A1 | * | 7/2001 | Ishibashi | .............. G06F 1/1626 705/14.4 |

(Continued)

FOREIGN PATENT DOCUMENTS

| CN | 101794228 A | * | 8/2010 | |
| GB | 2358722 A | * | 8/2001 | ............. G06Q 10/10 |
| GB | 2358722 A | * | 8/2001 | ............. G06Q 10/10 |

OTHER PUBLICATIONS

Consolvo, S., Klasnja, P., McDonald, D. W., & Landay, J. A. (2012). Designing for healthy lifestyles: Design considerations for mobile technologies to encourage consumer health and wellness. Human-Computer Interaction, 6(3-4), 167-315.*

(Continued)

*Primary Examiner* — Arpan P. Savla
*Assistant Examiner* — Linda Huynh
(74) *Attorney, Agent, or Firm* — Lee & Hayes, P.C.

(57) ABSTRACT

Techniques for providing notifications to user devices for the purpose of re-engaging users in content items they are consuming, such as electronic books, movies, videos, and the like. For instance, the techniques may calculate a frequency at which a user reads an electronic book. If the user does not request to read this electronic book for an abnormal amount of time, the techniques may provide a notification encouraging the user to again read the electronic book.

20 Claims, 8 Drawing Sheets

(56) References Cited

U.S. PATENT DOCUMENTS

| | | | | |
|---|---|---|---|---|
| 2003/0014674 A1* | 1/2003 | Huffman | ............... | G06F 1/1647 |
| | | | | 713/300 |
| 2012/0151351 A1* | 6/2012 | Kilroy | ................... | G06Q 30/02 |
| | | | | 715/733 |
| 2012/0210203 A1* | 8/2012 | Kandekar | ........... | G06F 15/0291 |
| | | | | 715/230 |
| 2013/0117702 A1* | 5/2013 | Jang | ................... | G06F 15/0291 |
| | | | | 715/776 |
| 2013/0151954 A1* | 6/2013 | Ierullo | ..................... | G09B 5/02 |
| | | | | 715/254 |
| 2013/0159850 A1* | 6/2013 | Cohn | ................... | G06F 40/103 |
| | | | | 715/273 |
| 2014/0125581 A1* | 5/2014 | Chitkara | ................ | G06F 3/013 |
| | | | | 345/156 |
| 2015/0006258 A1* | 1/2015 | Salama | ................. | G06Q 10/00 |
| | | | | 705/7.35 |
| 2015/0024355 A1* | 1/2015 | Ghofrani | ................ | F23Q 2/325 |
| | | | | 434/236 |
| 2015/0143281 A1* | 5/2015 | Mehta | ................... | G06Q 10/10 |
| | | | | 715/781 |

OTHER PUBLICATIONS

Munson, S. A., & Consolvo, S. (May 2012). Exploring goal-setting, rewards, self-monitoring, and sharing to motivate physical activity. In Pervasive Computing Technologies for Healthcare (PervasiveHealth), 2012 6th International Conference on (pp. 25-32). IEEE.*

* cited by examiner

CONTENT-ITEM NOTIFICATIONS

BACKGROUND

A large and growing population of users employs various electronic devices to consume digital content, such as music, movies, images, electronic books, and so on. Among these electronic devices are electronic book (eBook) reader devices, cellular telephones, desktop computers, portable media players, tablet computers, netbooks, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
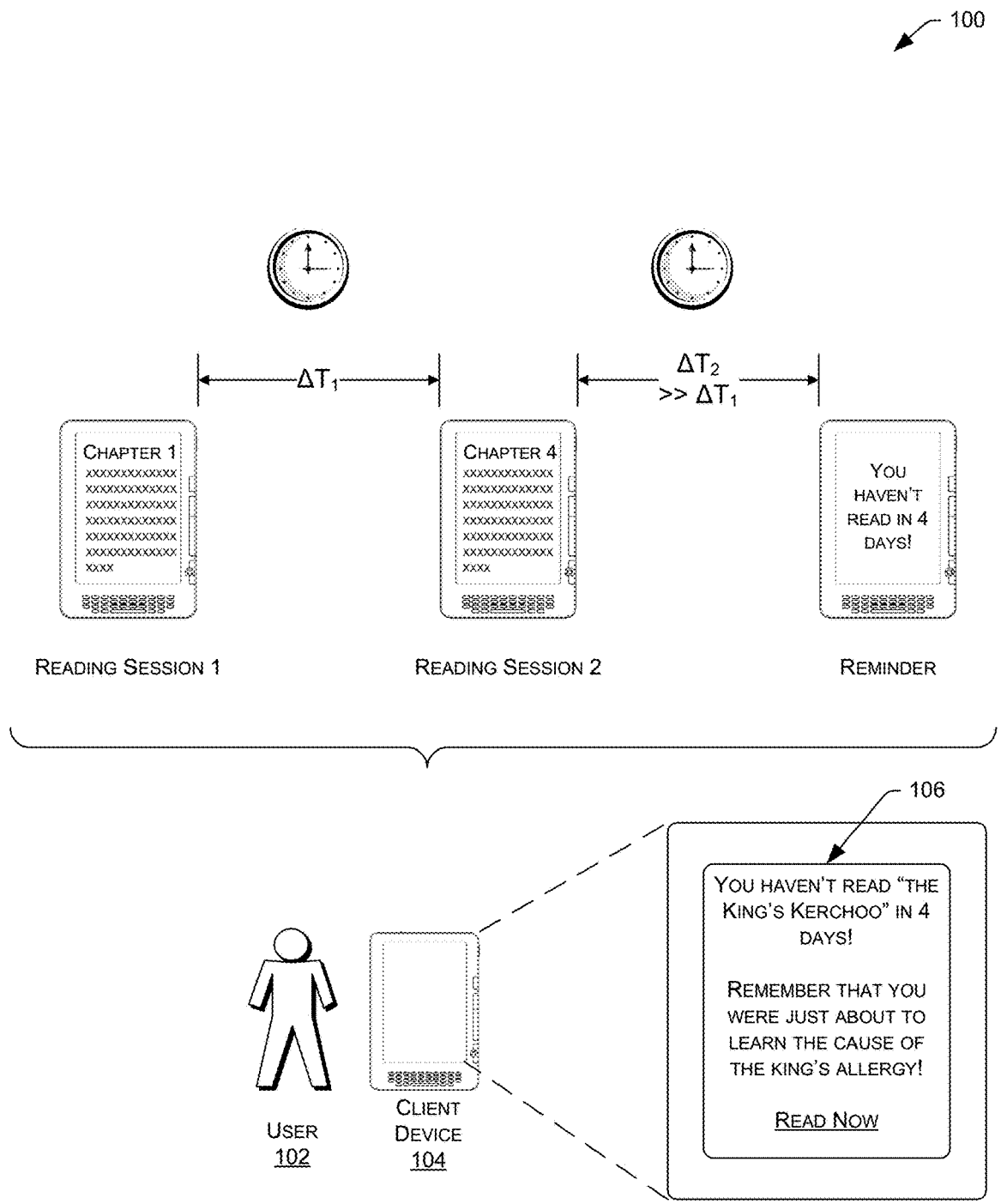
FIG. 1 illustrates an example scenario where a device of a user determines how often the user typically reads an electronic book and, in response to determining that an abnormal amount of time has passed without the user reading, suggests that the user again read the electronic book.

This disclosure describes, in part, techniques for providing notifications to user devices for the purpose of re-engaging users in content items they are consuming, such as electronic books, movies, videos, and the like. As described below, a user may use one or more electronic devices to consume a content item, such as an electronic book. For instance, a user may utilize an electronic book reader device, a tablet device, a laptop computer, and/or the like to read the electronic book. Each of these devices may be associated with an account of the user, such that each device maintains the current position of the user when the user reads on a respective device.

The devices and/or an entity that is remote from the devices (e.g., a content-item service that is accessible over a network) may monitor the user's consumption of the electronic book. That is, the device or entity may determine one or more reading metrics associated with the user's consumption, such as how often the user reads, how long the user typically reads for, how much content the user typically reads in one session, a reading rate of the user, and the like. In some instances, the device or entity may monitor the user's reading of the electronic book to determine a frequency of the user's reading sessions, such as once a day, once a week, or the like. This frequency may be based on an average amount of time between reading sessions, a median amount of time between reading sessions, and/or the like.

If the device and/or entity notice that the user has gone a threshold amount of time without reading the electronic book, then the device or entity may provide a notification to the user encouraging the user again read the electronic book. That is, if the user typically reads once a day, but goes three days without reading, then the device or entity may provide a message for display on one or more of the devices encouraging the user to again pick up the user's book. Additionally or alternatively, the device may provide notifications based on a geo-location of the device. The device may determine the geo-location based on global positioning satellite (GPS) coordinates, triangulation techniques, or the like.

In some instances described herein, the device or entity may also identify a position of the user within the electronic book that the user has been reading. That is, the device or entity may determine what chapter, page, or the like the user last read, and may include, as part of the notification, information that is based on this last-read position. For instance, the device or entity may summarize the plot at the last-read notification and may provide this refresh information as part of the message designed to encourage the user to again read the book. Or, the notification may include a snippet of text or an image from or adjacent to the last-read position.

In still other instances, the techniques described herein may apprise a user of reading progress of contacts of the user in a social network, contacts of the user in an address book, or the like. For instance, when a "friend" or "contact" of a user within a social network performs some certain action associated with a content item that may be of interest to the user, the user may be notified of this action. For instance, if a contact of the user within a social network purchases or otherwise obtains an electronic book that the user is currently reading or has read, then the device or entity may apprise the user of this information. Or, if the contact is reading a same electronic book as the user, then the device or entity may inform the user when the contact achieves certain benchmarks, such as finishing a particular chapter, reaching a point in the electronic book that the user is currently reading, having posted a review of the electronic book, having achieved a reading goal set by the contact, or the like. Furthermore, in some instances the device may provide an option (e.g., via a selectable icon) to cease receiving notifications from some or all contacts of the user. Additionally or alternatively, the device may allow the user to opt out from receiving all notifications or certain types of notifications. In still other instances, the device may allow (e.g., via a selectable icon) the user to dismiss the reminders for a certain amount of time before the device again surfaces them (e.g., a "remind me later" icon).

In some instances, the user may also be able to set reading goals on his or her device, and the device or entity may monitor the user's reading for the purpose of informing the user as to whether or not the user is likely to reach her goals. For instance, envision that the user sets a goal to read a certain number of electronic books in one month, to read a particular book within two weeks, or the like. The device or entity may monitor the user's consumption of electronic books and may compare these "reading metrics" to the user's preset reading goals. The device may then message this information to the user, in some instances in combination with encouraging the user to again read an electronic book. For instance, the device or entity may provide the following message to the user: "You haven't read in 4 days. Read 3 chapters by tomorrow and you will be back on pace to reach your monthly reading goal."

In yet another example, the device may notify the user when the user is about to lose access rights to an electronic book. For instance, if a user "checks out" a copy of an electronic book for a two-week period of time, then just before expiration of the two weeks (or at some other time), the device may notify the user that the user is about to lose rights to view the book.

In still other examples, the device may notify the user about potential incentives for reading the book, either offered by the author of the book, a publisher of the book, a contact of the user on a social network or the like. For instance, the author may associate, with the book, a message to readers that reach a certain location in the book. Upon reaching that location, the device may "unlock" the message, which may be a textual message, an audio message, or a video message. Therefore, when the user is within a threshold distance from the location in the book, the device may notify the user to encourage the user to pick up the book and reach the location. In a related example, the author or another entity may surface an invitation to the user to receive certain other content (e.g., another book of the author) when the user reaches a certain point in the book or after the user reads for a certain amount of time. The device may notify the user when the user approaches this location or amount of reading time.

While many of the examples described herein involve a device notifying a user, in order to prompt the user to pick up an electronic book, in some instances the notifications may relate to consumption of a physical book. For instance, a user may input, into an application operating on a client device, information regarding the user's reading of a physical book. For instance, the user may log the length, time, date, and/or the like of the user's reading sessions. The device may then prompt, via the device, the user to again pick up the physical book if an amount of time between entries is greater than a threshold amount of time.

The techniques of intelligently suggesting that a user re-engage a content item may be implemented in a variety of ways and by a variety of electronic devices. While a few examples are illustrated and described below, it is to be appreciated that other electronic devices may implement any similar or different techniques. Furthermore, it is noted that the term "electronic book", "eBook", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, anthologies, proceedings of meeting, forms, directories, maps, manuals, guides, references, photographs, articles, reports, documents, etc., and all forms of audio and audiovisual works such as music, multimedia presentations, audio books, movies, etc.

FIG. 1 illustrates an example scenario 100 where a user 102 operates a device 104 to consume content items, such as electronic books, movies, videos, and the like. The device 104 may monitor the user's consumption for the purpose of identifying a frequency at which the user consumes content items. For instance, the device 104 may monitor how often a user reads, either generally or how often a user reads a particular electronic book. The device may then intelligently provide reminders to the user to read, based on this monitored consumption. That is, the device 104 may tailor how often and when to provide reminders to the user. While FIG. 1 and the following figures describe the device 104 generating and providing the reminders to the user 102, in other instances an entity that is remote from the device may monitor the user's content-item consumption and/or generate the reminder for the user 102. In these instances, the remote entity may send the reminder for display on the device 104.

FIG. 1 illustrates that the user 102 has used the device 104 during a first reading session ("reading session 1"). Thereafter, an amount of time passes ($\Delta T_1$) before the user engages in a second reading session ("reading session 2") with the electronic book. The device 104 may continue to monitor how much time passes between these reading session in order to determine (e.g., calculate or estimate) a frequency at which the user 102 typically reads the electronic book.

In this example, an amount of time elapses ($\Delta T_2$) that is much greater than the first amount of time. As such, the device 104 provides a reminder 106 for display on the device 104. In this example, the reminder 106 indicates how much time has passed since the last time that the user read the example book. The reminder 106 also includes a link, selection of which executes instructions on the device 104 for displaying the electronic book on the device 104 at the last-read position. While FIG. 1 illustrates the device providing one example reminder 106, in other instances the notification may comprise any other sort of content, such as information regarding what is about to happen in the book (past the location of the user), questions regarding the work, reviews provided by other users associated with the book, or the like.

Figure 2:
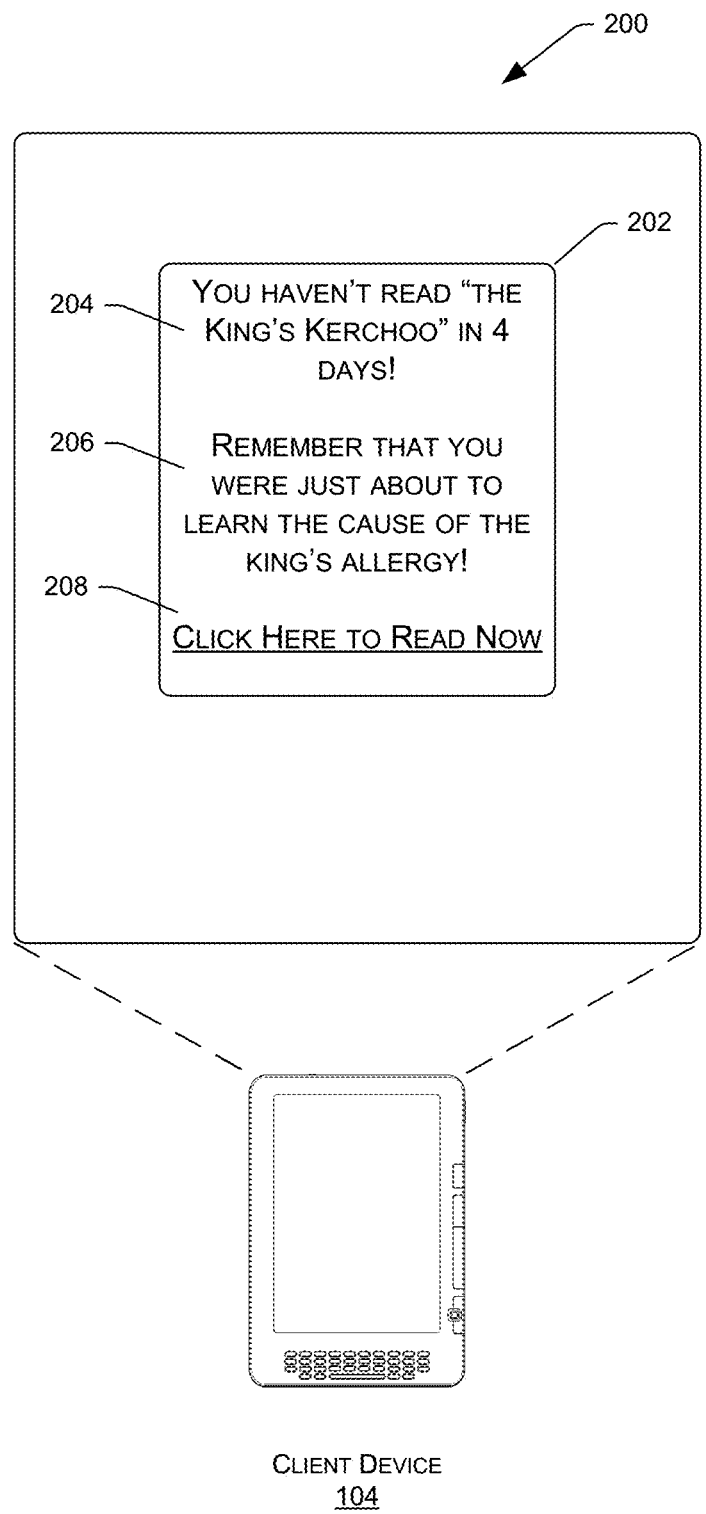
FIG. 2 illustrates an example user interface (UI) that may be used to suggest that the user again read the electronic book shown in FIG. 1.

FIG. 2 illustrates an example user interface (UI) 200 the device 104 of FIG. 1 may display in response to a user not reading an electronic book for an amount of time that is atypical for the user. As illustrated, the UI 200 includes a reminder 202 that includes a portion 204 indicating that the user 102 has not read the book "The King's Kerchoo" in four days. The reminder 202 also includes a portion 206 displaying content that is associated with a position of the electronic book that the user 102 last read. That is, the portion 206 may include a summary of the plot at the last-read position, content adjacent to the last-read position (e.g., text, an image, etc.), or the like. In this example, the portion 206 of the reminder 202 indicates that the user 102 was about to "learn the cause of the King's allergy!" Finally, this example reminder 202 includes a link 208, selection of which causes the device 104 to launch a reading application for displaying the electronic book at the last-read position.

Figure 3:
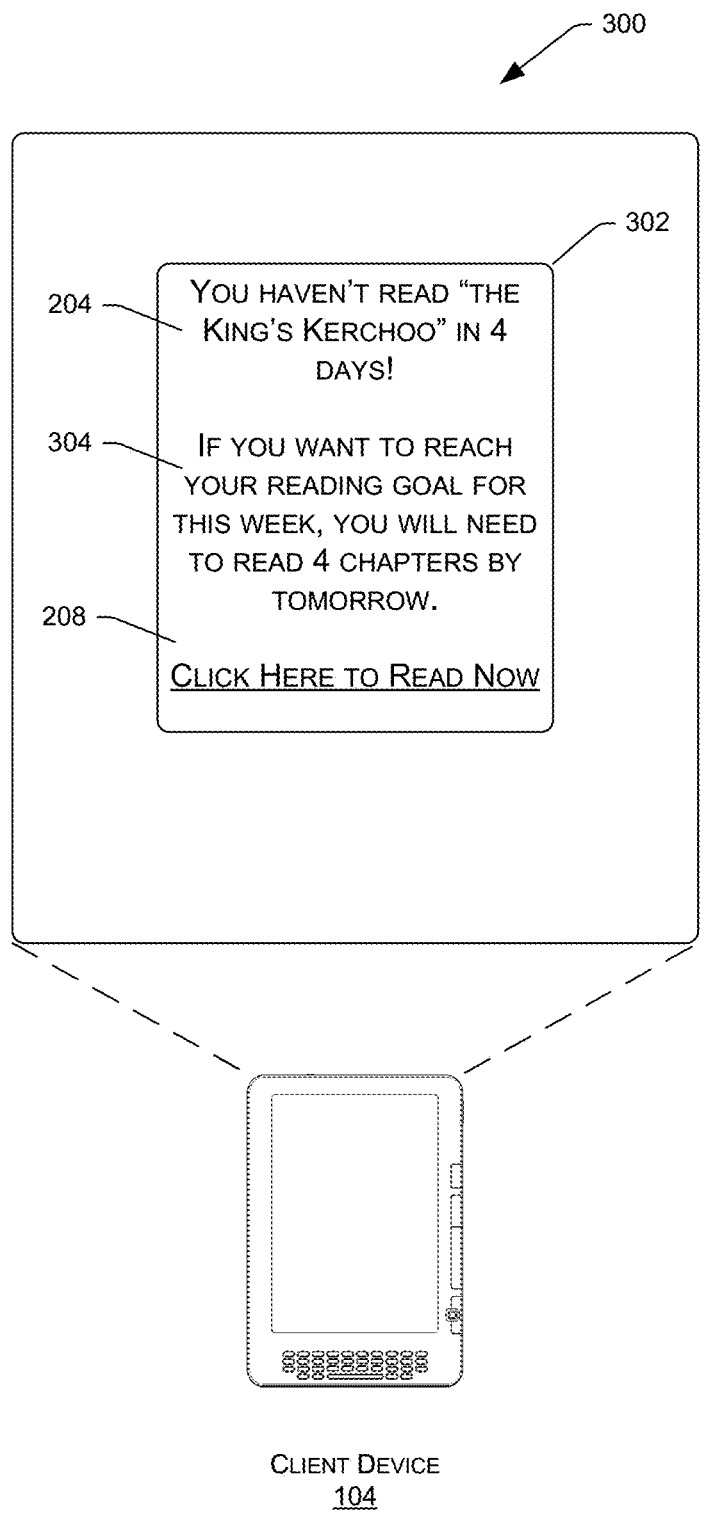
FIG. 3 illustrates another example UI that may be used to suggest that the user again read the electronic book shown in FIG. 1. In this example, the UI also provides information regarding how the user may be able to reach his or her preset reading goal.

FIG. 3 illustrates another example UI 300 the device 104 may display in response to the user 102 not reading an electronic book for an amount of time that is atypical for the user 102. In this example, an example reminder 302 includes a portion 304 indicating that the user will need to read four chapters tonight in order to reach the user's reading goal for the week. As discussed above, the user 102 may have previously set a reading goal, in this example for the current week. The device 104 may then compare the user's cumulative amount of reading for this week to the reading goal. The device 104 may then calculate how much reading the user 102 will need to do in order to reach the reading goal. As such, the device 104 may surface the reminder 302, that not only encourages the user 102 to again read the electronic book, but that also includes the indication of how much the user 102 needs to read in order to reach his or her goal.

Figure 4:
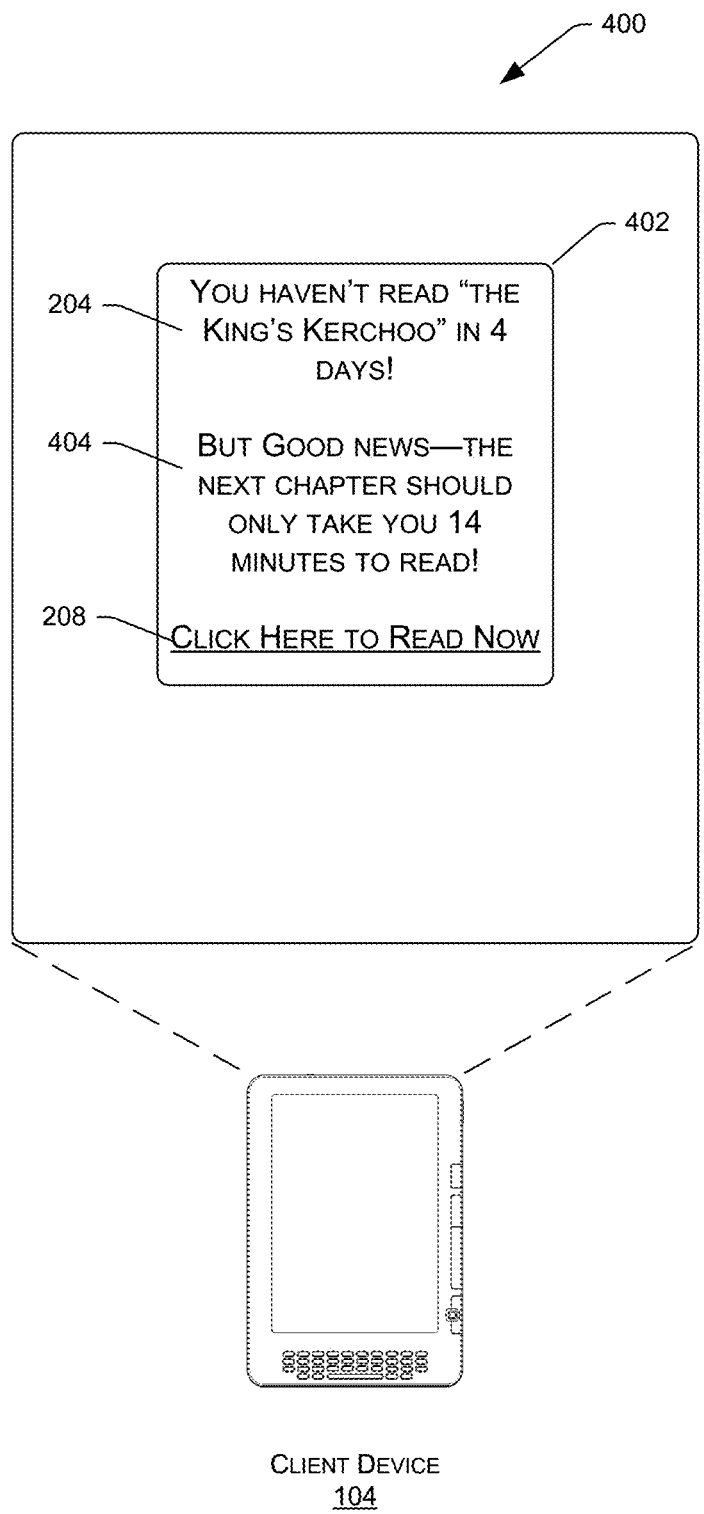
FIG. 4 illustrates another example UI that may be used to suggest that the user again read the electronic book shown in FIG. 1. In this example, the UI also informs the user about the upcoming contents of the book.

FIG. 4 illustrates another example UI 400 that the device 104 may display to suggest that the user again read the electronic book. In this example, the UI 400 includes a reminder 402 that includes a portion 404 indicating information about the upcoming contents of the book. In this example, the portion 404 indicates that the next chapter should only take fourteen minutes to read based on the reading rate of the user calculated by the device 104. Although FIGS. 1-4 illustrate example reminders for encouraging the user 102 to re-engage an electronic book, it is to be appreciated that these are just several of many examples.

Figure 5:
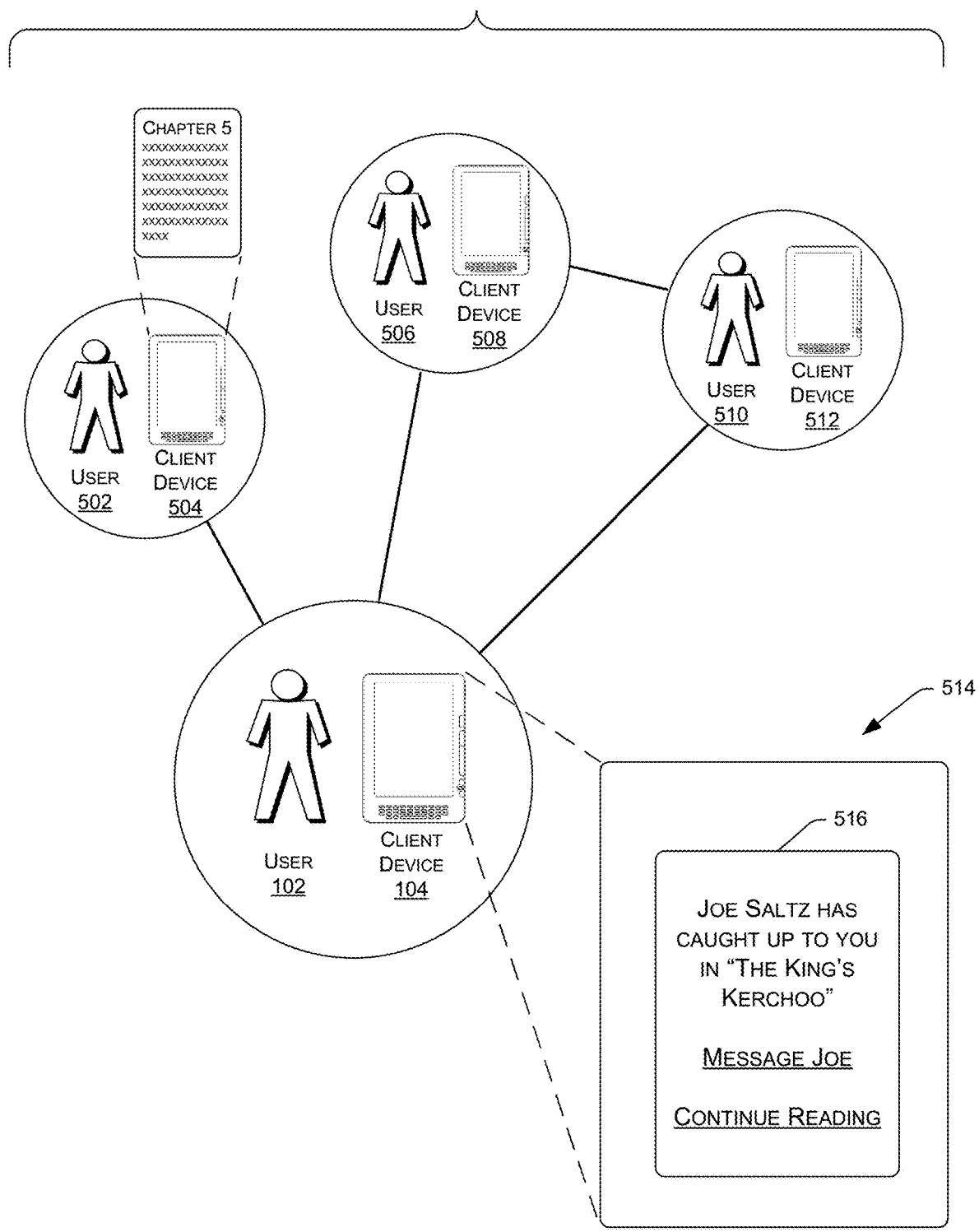
FIG. 5 illustrates an example scenario where a contact of the user in a social network has performed a specified action in association with the electronic book of FIG. 1. In response, the device of the user informs the user of the action.

FIG. 5 illustrates an example scenario 500 where a contact of the user 102 in a social network 500 has performed a specified action in association with the electronic book from above. In response, the device 104 of the user 102 informs the user of the action.

As illustrated, the user 102 has several example contacts in the social network 500, with these contacts indicated by a line connecting the user 102 to another user of the network. The illustrated portion of the social network 500 includes a user 502 that consumes content items with a device 504, a user 506 that consumes content items with a device 508, and a user 510 that consumes content items with a device 512. In this example, each of users 502, 506, and 510 are contacts of the user 102 in the social network 500.

In this example, the user 502 performs an action in association with the electronic book that the user 102 is also reading. In this example, the user 102 reaches a position in the electronic book that the user 102 is also at. As such, the device 104 provides a notification of this action to the user 102. That is, FIG. 5 illustrates the device 104 displaying a UI 514 that includes a notification 516, indicating that the user 502 ("Joe Saltz") has reached the portion of the electronic book that the user 102 has also reached (chapter 5). The notification 516 also includes a link that is selectable to send a message to the user 502 (e.g., over the social network 500) and a link that is selectable for the purpose of continuing to read the electronic book. Although FIG. 5 illustrates an example of notifying the user 102 when the user 502 reaches a same position as the user 102 in the electronic book, in other examples the action may comprise the user 502 purchasing or obtaining the same electronic book as the user 102, the user 502 beginning the electronic book, the user 502 completing the electronic book, or the like.

Figure 6:
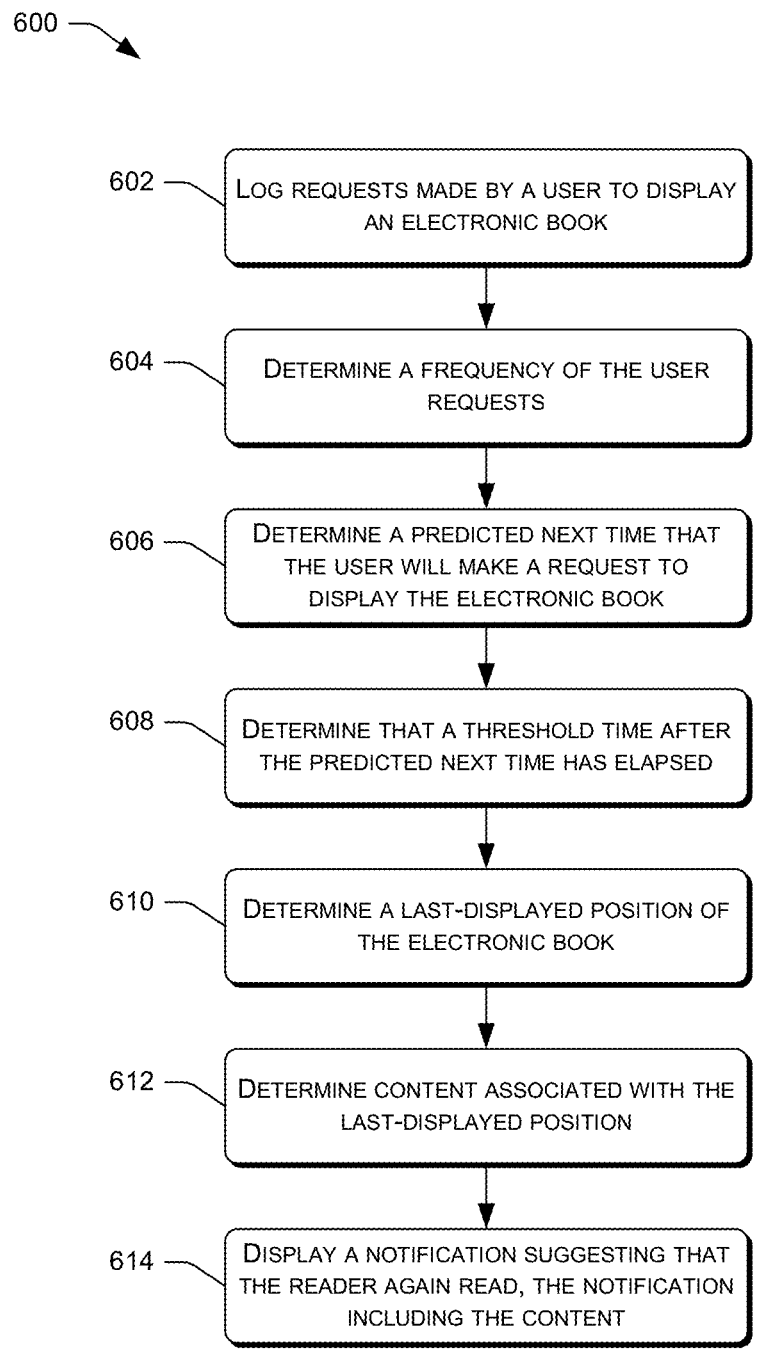
FIG. 6 illustrate an example flow diagram of a process for encouraging a user to read an electronic book after the user has set the book aside for a threshold amount of time.

FIG. 6 illustrate an example flow diagram of a process 600 for encouraging a user to read an electronic book after the user has set the book aside for a threshold amount of time. The processes discussed below are each illustrated as a collection of blocks in a logical flow graph, which represent a sequence of operations that can be implemented in hardware, software, or a combination thereof In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In addition, the processes described herein may be performed by a client device, a service that is remote from a client device, or a combination thereof.

At 602, the process 600 logs requests made by a user to display an electronic book. This logging may include logging when the user makes the requests, how long the user reads the electronic book, how fast the user reads, and the like. At 604, the process 600 determines, based on the logged requests, a frequency of the user's requests to display the electronic book.

At 606, the process 600 determines a next predicted time that the user will request to display the electronic book. For instance, if the process 600 determines that, on average, the user requests to read the electronic book every two days, then the process 600 may determine that the user is likely to request to request to display the book two days after a last reading session. At 608, the process 600 determines that a threshold amount of time after the next predicted time has elapsed (e.g., one day after the user hasn't read for two straight days). The user may set this threshold amount of time in some instances.

At 610, the process 600 may determine a position in the electronic book that was last read by the user and, at 612, the process 600 may determine content associated with this position. For instance, this content may comprise a summary of the plot at that last-read position, may comprise content adjacent to this position, or the like. At 614, the process 600 displays a notification suggesting that the user again read the book, with the notification including the content identified at the operation 612. For instance, the process 600 may display the reminder 202 from FIG. 2.

Figure 7:
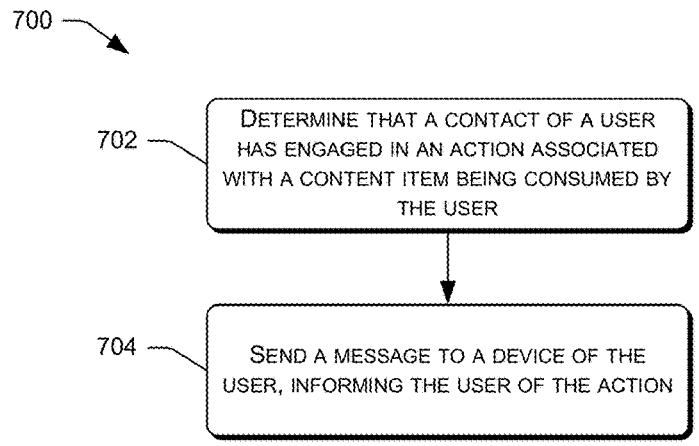
FIG. 7 illustrates an example flow diagram of a process of informing a user when a contact of the user in a social network performs a specified action in association with a content item that the user is currently consuming.

FIG. 7 illustrates an example flow diagram of a process 700 of informing a user when a contact of the user in a social network performs a specified action in association with a content item that the user is currently consuming. At 702, the process 700 determines that a contact of a user in a social network has performed an action in association with a content item that the user is also consuming. The content item may comprise a digital item (e.g., an electronic book) or a physical item (e.g., a physical book). For instance, the contact may have acquired the content item, achieved a reading goal of the contact (e.g., finishing the physical or electronic book), or the like. At 704, the process 700 notifies the user of the action performed by the contact. For instance, the process 700 may display a notification similar to the notification 516 of FIG. 5.

Figure 8:
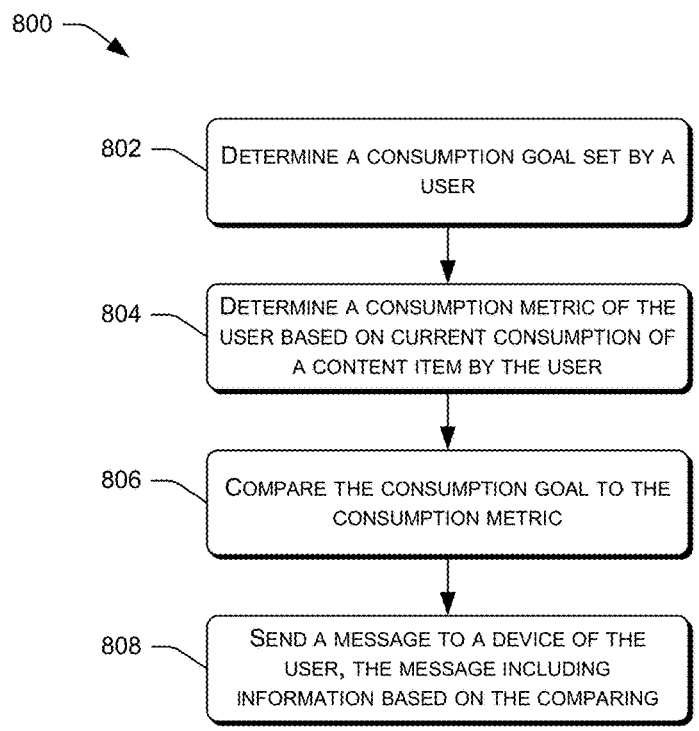
FIG. 8 illustrates an example flow diagram of a process of providing information regarding a user's preset reading goal to the user.

FIG. 8 illustrates an example flow diagram of a process 800 of providing information regarding a user's preset reading goal to the user. At 802, the process 800 determines a consumption goal set by the user. For instance, the user may have previously specified that he or she has a goal of reading a certain amount of content each week. At 804, the process 800 determines a consumption metric that is based on current consumption of a content item by the user. This could be automatically logged on device(s) of the user on which the user reads (e.g., in the case of electronic book) and/or based on information logged by the user on a device (e.g., in the case of a physical book). For instance, the process 800 may determine how much the user has read this week or the like. At 806, the process 800 compares the consumption goal to the consumption metric and, at 808, sends a message to a device of the user, with the message including information that is based on the comparing. For instance, the message may include an indication that the user will be on pace for his or her reading goal if the user reads a certain amount of a certain amount of time. For instance, the process 800 may display a notification similar to the reminder 302 of FIG. 3.

Figure 9:
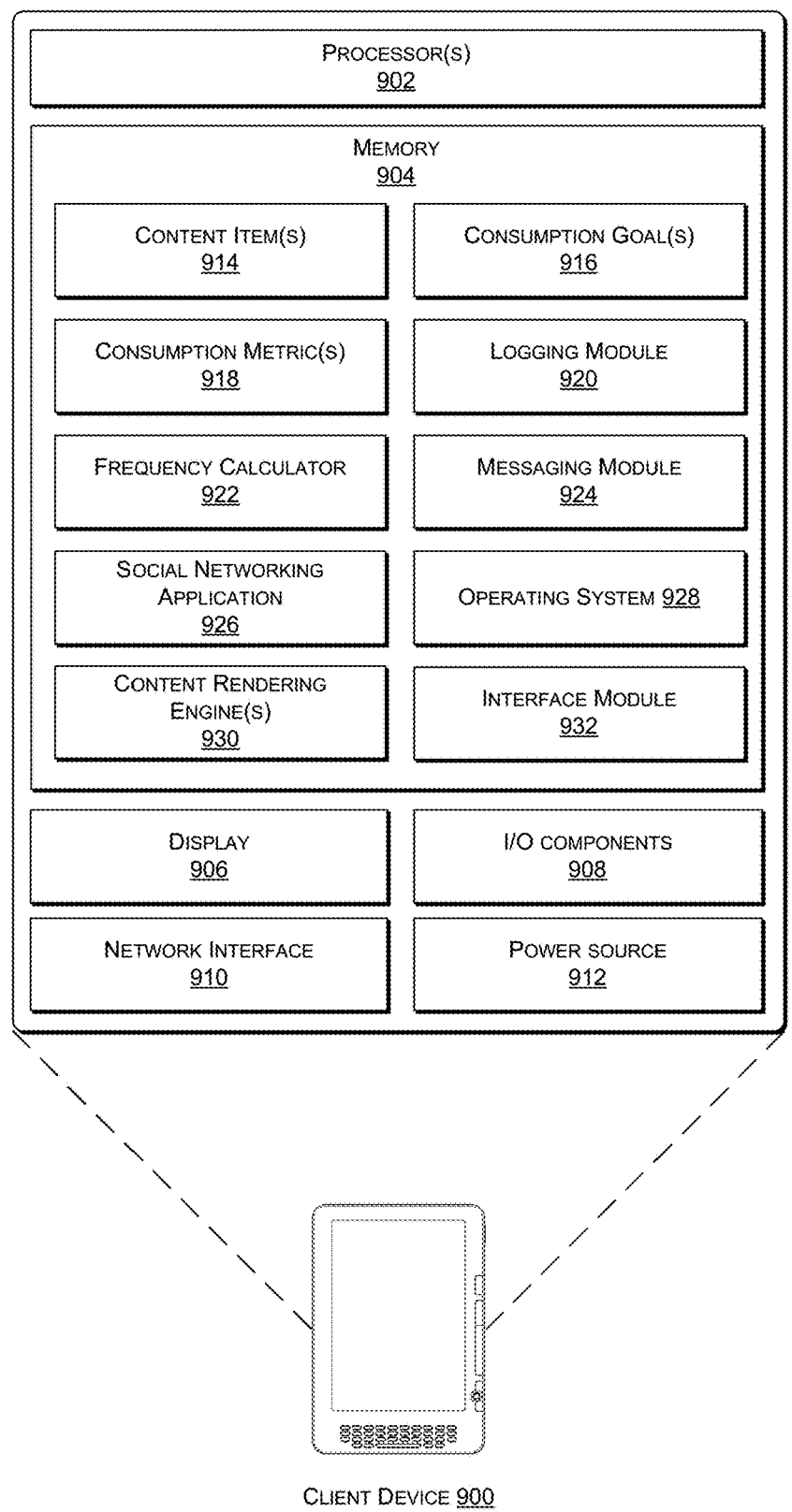
FIG. 9 illustrates an example electronic book reader device that includes features for implementing the techniques described herein.

FIG. 9 illustrates an example electronic device 900 that includes features for implementing the techniques described herein. As illustrated, the electronic device 900 may include one or more processors 902 and memory 904, one or more displays 906 for displaying content items, one or more I/O components 908 for interacting with the device, one or more network interfaces 910, and one or more power sources 912. The network interfaces 910 may support both wired and wireless connection to various networks, such as cellular networks, radio, WiFi networks, short range networks (e.g., Bluetooth®), infrared (IR), and so forth.

Depending on the configuration of the electronic device 900, the memory 904 (and other memory described throughout) is an example of computer storage media and may include volatile and nonvolatile memory. Thus, the memory 904 may include, but is not limited to, RAM, ROM, EEPROM, flash memory, or other memory technology, or any other medium that can be used to store computer-readable instructions, programs, applications, media items, and/or data which can be accessed by the electronic device 900. In some examples, the computer-readable media is a tangible non-transitory computer-readable media.

The memory 904 may be used to store any number of functional components that are executable on the processor 902, as well as content items 914 that are rendered by the electronic device 900. The memory 904 may also store consumption goals 916 set by the user, as well as consumption metrics 918 of the user. As described above, these metrics may include how often a user reads, how fast a user reads, and the like.

The memory may also store a logging module 920, a frequency calculator 922, a messaging module 924, and a social networking application 926. The logging module 920 may function to log when a user requests to display or otherwise output a content item, such as a book or movie. The frequency calculator 922, meanwhile, may calculate a frequency at which the user tends to issue the requests to display or output content items. For instance, the calculator 922 may calculate how often the user reads a particular electronic book, and may store this information in the consumption-metrics datastore 918. The messaging module 924 may then provide messages to the user, such as the messages described above. These include suggestions to read an electronic book, indications of whether the user is on pace to reach his or her reading goal, or the like. The social networking application 926, meanwhile, may define a social network, which may be referenced for identifying when contacts of the user perform certain actions, such as acquiring an electronic book that the user of the device 900 is also currently reading, and the like.

The memory 904 may also include an operating system 928 and one or more content rendering engines 930 to render content items on the device 900. These content presentation engines may be implemented as various applications depending upon the content items. For instance, the content presentation engine may be an electronic book reader application for rendering textual electronic books, an audio player for playing audio books or songs, a video player for playing video, and so forth. The memory 904 may also store an interface module 932 for interacting with the device 900.

While FIG. 9 illustrates a few example components, the electronic device 900 may have additional features or functionality. For example, the device 900 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 900 may reside remotely from the device 900 in some implementations.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device, comprising:
    a display;
    one or more processors; and
    one or more computer-readable media storing computer-executable instructions that, when executed, cause the one or more processors to perform acts comprising:
        logging requests made by a user to display an electronic book on the display, the electronic book comprising at least one of text or images;
        determining, based at least in part on the logging, a frequency at which the user requests to display the electronic book on the display;
        after determining the frequency, determining a next predicted time at which the user is expected to request to display the electronic book;
        determining that a threshold amount of time after the next predicted time has elapsed without the user having requested to display the electronic book;
        determining a position in the electronic book last displayed on the display;
        determining at least one of text or an image associated with the position; and
        displaying, on the display, a notification, the notification comprising at least:
            a suggestion that the user request to display the electronic book, the suggestion comprising at least an indication of an amount of time since the user last requested to display the electronic book;
            the at least one of the text or the image associated with the position; and
            a link, selection of which causes the display to present the electronic book at the position.

2. An electronic device as recited in claim 1, wherein the text associated with the position includes a review of a plot of the electronic book at the position.

3. An electronic device as recited in claim 1, the acts further comprising:
    receiving an indication that a contact of the user on a social network has achieved a reading goal that is associated with the electronic book; and
    displaying, on the display, a notification informing the user that the contact of the user on the social network has achieved the reading goal.

4. An electronic device as recited in claim 1, wherein the threshold amount of time has been set, at least in part, based on an instruction from the user.

5. An electronic device as recited in claim 1, the acts further comprising:
determining that the user has previously specified a reading goal; and
determining whether or not the user is on pace to achieve the reading goal,
wherein the notification further comprises:
an indication of whether or not the user is on pace to achieve the reading goal; and
based at least in part on determining that the user is not on pace to achieve the reading goal, information regarding an amount of the electronic book the user is to read in an amount of time to be on pace to achieve the reading goal.

6. A method comprising:
monitoring reading sessions of a user on one or more electronic devices;
determining a frequency of the reading sessions of the user based at least in part on the monitoring;
determining, based at least in part on the frequency, an amount of time after which to remind the user to engage in a reading session if the user has not engaged in a reading session during the amount of time;
determining that the user has not engaged in a reading session during the amount of time;
determining a position of an electronic book last read by the user, the electronic book comprising at least one of text or images;
determining at least one of text or an image associated with the position; and
sending a message to at least one of the one or more electronic devices, the message including at least:
a reminder for the user to read the electronic book, the reminder comprising at least an indication of a length of time since the user has engaged in a reading session;
the at least one of the text or the image associated with the position; and
a link, selection of which causing a display, on at least one of the one or more electronic devices, of the electronic book at the position.

7. A method as recited in claim 6, further comprising:
determining a plot summary at the position of the electronic book last read by the user; and
wherein the message further includes the plot summary.

8. A method as recited in claim 6, further comprising:
identifying a reading goal previously set by the user;
identifying at least one reading metric of the user based at least in part on previous reading sessions of the user; and
comparing the reading goal to the at least one reading metric to determine whether or not the user has achieved or is on pace to achieve the reading goal; and
wherein the message further includes information based at least in part on whether or not the user has achieved or is on pace to achieve the reading goal.

9. A method as recited in claim 6, further comprising:
determining that a contact of the user has engaged in an action associated with an electronic book that the user has begun reading but has not yet finished; and
sending another message to at least one of the one or more electronic devices, the another message informing the user of the action of the contact.

10. A method as recited in claim 9, wherein the action comprises at least one of the contact having begun reading the electronic book, having finished reading the electronic book, having reached or passed a position in the electronic book that the user is currently at, having posted a review of the electronic book, or having achieved a reading goal set by the contact.

11. A method as recited in claim 6, further comprising:
monitoring an activity, other than reading, by the user on the one or more electronic devices; and
comparing an amount of time spent by the user performing the activity to an amount of time spent by the user reading on the one or more electronic devices; and
wherein the message further includes information that is based at least in part on the comparing.

12. A method implemented at least in part by a computing device, the method comprising:
determining a frequency of reading sessions of a user;
determining, based at least in part on the frequency, an amount of time after which to remind the user to engage in a reading session if the user has not engaged in a reading session during the amount of time;
determining that the user has not engaged in a reading session during the amount of time;
determining a position of an electronic book last read by the user, the electronic book comprising at least one of text or images;
determining at least one of text or an image associated with the position; and
sending a message to one or more electronic devices of the user, the message including at least:
a reminder for the user to read the electronic book, the reminder comprising at least an indication of a length of time since the user has engaged in a reading session;
the at least one of the text or the image associated with the position; and
information about the contents of the electronic book subsequent to the position of the electronic book last read by the user.

13. A method as recited in claim 12, further comprising receiving, from the user, information regarding the reading sessions of the user, and wherein the determining the frequency comprises determining the frequency based at least in part on the receiving of the information regarding the reading sessions from the user.

14. A method as recited in claim 12, further comprising monitoring, on the one or more electronic devices of the user, the reading sessions of the user, and wherein the determining the frequency comprises determining the frequency based at least in part on the monitoring.

15. A method as recited in claim 12, further comprising:
determining that the user has previously specified a reading goal; and
determining whether or not the user is on pace to achieve the reading goal,
wherein the message further includes:
an indication of whether or not the user is on pace to achieve the reading goal; and
based at least in part on determining that the user is not on pace to achieve the reading goal, information regarding an amount of the electronic book the user is to read in an amount of time to be on pace to achieve the reading goal.

16. A method as recited in claim 12, wherein the text associated with the position includes a summary of a plot of the electronic book at the position.

17. A method as recited in claim 12, further comprising:
 determining that a contact of the user has engaged in an action associated with an electronic book that the user has begun reading but has not yet finished; and
 sending another message to at least one of the one or more electronic devices, the another message informing the user of the action of the contact.

18. A method as recited in claim 17, wherein the action comprises at least one of the contact having begun reading the electronic book, having finished reading the electronic book, having reached or passed a position in the electronic book that the user is currently at, having posted a review of the electronic book, or having achieved a reading goal set by the contact.

19. A method as recited in claim 12, further comprising:
 determining that a contact of the user has engaged in an action associated with an electronic book that the user has begun reading but has not yet finished; and
 sending another message to at least one of the one or more electronic devices, the another message informing the user of the action of the contact.

20. A method as recited in claim 19, wherein the action comprises at least one of the contact having begun reading the electronic book, having finished reading the electronic book, having reached or passed a position in the electronic book that the user is currently at, having posted a review of the electronic book, or having achieved a reading goal set by the contact.

\* \* \* \* \*